United States Patent
Manry, Jr. et al.

(10) Patent No.: US 9,515,373 B2
(45) Date of Patent: Dec. 6, 2016

(54) INTEGRATED ANTENNA TRANSCEIVER FOR SENSOR AND DATA TRANSMISSION ON ROTATING SHAFTS

(71) Applicant: The Boeing Company, Chicago, IL (US)

(72) Inventors: Charles W. Manry, Jr., Auburn, WA (US); Manny S. Urcia, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 388 days.

(21) Appl. No.: 14/019,348

(22) Filed: Sep. 5, 2013

(65) Prior Publication Data

US 2015/0061947 A1 Mar. 5, 2015

(51) Int. Cl.
| | |
|---|---|
| *H01Q 1/36* | (2006.01) |
| *H01Q 1/22* | (2006.01) |
| *H02J 17/00* | (2006.01) |
| *H01Q 11/08* | (2006.01) |
| *H01Q 5/40* | (2015.01) |
| *H01P 1/06* | (2006.01) |

(52) U.S. Cl.
CPC .............. *H01Q 1/22* (2013.01); *H01Q 1/2208* (2013.01); *H01Q 1/362* (2013.01); *H01Q 5/40* (2015.01); *H01Q 11/08* (2013.01); *H02J 17/00* (2013.01); *H01P 1/068* (2013.01)

(58) Field of Classification Search
CPC .......... H01Q 1/22; H01Q 1/2208; H01Q 1/36; H01Q 1/362; H01Q 5/40; H01Q 11/08; H02J 17/00; H01P 1/068

USPC ................................. 343/895, 720, 796, 797
See application file for complete search history.

(56) References Cited

U.S. PATENT DOCUMENTS

| | | | |
|---|---|---|---|
| 3,999,186 A * | 12/1976 | Majkrzak ................. | H01Q 1/34 343/709 |
| 4,939,400 A | 7/1990 | Matsushita et al. | |
| 6,897,830 B2 * | 5/2005 | Bae ......................... | H01Q 1/243 343/895 |
| 2002/0018026 A1* | 2/2002 | Noro ....................... | H01Q 1/362 343/895 |
| 2009/0033180 A1 | 2/2009 | Abe | |
| 2012/0019427 A1* | 1/2012 | Ishikawa .............. | H01Q 1/2216 343/833 |

FOREIGN PATENT DOCUMENTS

| | | |
|---|---|---|
| EP | 0707388 | 4/1996 |
| WO | 96/37921 | 11/1996 |

OTHER PUBLICATIONS

Extended European Search Report, Patent Application No. 14183808.6 dated Feb. 12, 2015.
(Continued)

*Primary Examiner* — Hoanganh Le
(74) *Attorney, Agent, or Firm* — Kunzler Law Group, PC

(57) ABSTRACT

A method and system for communication with assemblies comprising shafts (e.g., drive shafts, or other rotating objects) comprising use of helical antenna based components. In this regard, a helical antenna based component may comprise one or more helical antennas surrounding or wound around a shaft, with the one or more helical antennas being electrically decoupled from the shaft, and with the helical antenna based component being configurable to communicate the signals when the shaft is stationary or rotating.

25 Claims, 6 Drawing Sheets

(56) References Cited

OTHER PUBLICATIONS

Office Action for Canadian Application No. 2,854,119 dated Aug. 6, 2015.
Office Action for Canadian Patent Application No. 2,854,119 dated Jul. 11, 2016.

* cited by examiner

INTEGRATED ANTENNA TRANSCEIVER FOR SENSOR AND DATA TRANSMISSION ON ROTATING SHAFTS

FIELD

Certain embodiments of the disclosure relate to communications. More specifically, certain embodiments of the disclosure relate to an apparatus and method for an integrated antenna transceiver for sensor and data transmission on rotating shafts.

BACKGROUND

In some instances, data may be communicated to and/or from particular objects or structures, such as mechanical drive based systems. In this regard, the data communication may pertain to, for example, monitoring the health of drive systems, particularly under operation by real time monitoring of drive(s) shaft torque, vibration, and/or stress. The monitoring may, for example, enable system operators to detect and repair mechanical issues before they become critical, and replace or repair the drive system components before failure. Accordingly, communication means (e.g., transceivers) may be used to facilitate communication to and/or from moving objects (e.g., to allow operators to transmit data request, and/or to receive from the moving objects data comprising request responses and/or sensory data). In some instances, the user of transceiver may also allow and/or facilitate wireless transfer of electrical power moving objects, components thereof, and/or devices or systems attached thereto (e.g., sensors and/or transceivers). Existing methods and systems for performing such communications and/or wireless power transfer (i.e., to and/or from moving objects) may be costly, cumbersome and inefficient—e.g., they are complex and/or may be affected by the operation of the moving objects. Therefore, it would be advantageous to have a system and a method for performing such communications in optimized manner, such as based on use of compact and/or simple, yet effective means, for accomplishing this function.

Further limitations and disadvantages of conventional and traditional approaches will become apparent to one of skill in the art, through comparison of such systems with some aspects, as set forth in the remainder of the present application with reference to the drawings.

SUMMARY

An apparatus and/or method is provided for use of an integrated antenna transceiver for and data communication with and/or wireless power transfer to rotating shafts (particularly sensors attached thereto), substantially as shown in and/or described in connection with at least one of the figures, as set forth more completely in the claims.

In one aspect, a method for communication of signals to/from a shaft assembly (e.g., an assembly comprising a shaft, such as a drive shaft or other rotating objects), and/or for wireless power transfer to the shaft assembly, may comprise use of a helical antenna component (e.g., a component comprising at least one helical antenna). In this regard, the helical antenna component may surround (or be wound around) the shaft, with the helical antenna component (or at least the helical antenna(s) thereof) being electrically decoupled from the shaft, to enable communication to and/or from the shaft during operation or use of the shaft.

In one embodiment, signals may be communicated via the helical antenna component when the shaft is stationary or rotating.

In one embodiment, the helical antenna component may be electrically decoupling from the shaft using a dielectric sleeve.

In one embodiment, signals transmitted or received via the helical antenna component may be utilized in communicating data related to a sensor on the shaft.

In one embodiment, power may be transferred to the shaft assembly wirelessly via radio frequency (RF) signals received via the helical antenna component. In this regard, at least a portion of a transferred power may be utilized to power a sensor, electronic components in shaft assembly, and/or components coupled to the shaft assembly.

In one embodiment, the helical antenna component may comprise a plurality of helical antennas, and the helical antenna component may be configured such that each of the plurality of helical antennas may utilize one of a plurality of separate, distinct, closely spaced narrow band frequencies, providing signal separation and diversity.

In one embodiment, the helical antenna component may be configured to interact with one or more corresponding stationary transceiver assemblies.

In one embodiment, the helical antenna component and a corresponding stationary transceiver assembly may be configured to use windings around a core simulating a radio frequency (RF) transformer during communication of signals, wherein: the helical antenna component may comprise a first antenna comprising a shaft mounted winding, with the shaft mounted winding comprising a winding wire, or thin and closely spaced direct wire traces coupled to a dielectric sleeve, as one side of the transformer, the stationary transceiver assembly may comprise a second antenna that comprises a wire winding around a core, and the first antenna and the second antenna may be placed in close proximity to form a transceiver pair.

In another aspect, a system for communication of signals to/from a shaft assembly (e.g., an assembly comprising a shaft, such as a drive shaft or other rotating objects), and/or for wireless power transfer to the shaft assembly, may comprise a helical antenna component. In this regard, the helical antenna component may comprise one or more helical antennas surrounding (or wound around) the shaft, with the helical antenna component (or particularly, the one or more helical antennas) being electrically decoupled from the shaft, and with the helical antenna component being configurable to communicate the signals when the shaft is stationary or rotating.

In one embodiment, the signals communicated via the helical antenna component may be utilized in one or more of: communication of data related to a sensor on the shaft and a wireless transfer of power to the shaft assembly. In this regard, at least a portion of the transferred power is utilized to power the sensor, electronic components in shaft assembly, and/or devices coupled to the shaft assembly.

In one embodiment, the helical antenna component may be electrically decoupled from the shaft using a dielectric sleeve.

In this regard, the dielectric sleeve may comprise one or more of: a direct write method, a machined sleeve, or a low-loss dielectric foam.

In one embodiment, the helical antenna component may be coupled to a sensor on the shaft.

In this regard, the sensor may comprise a torque and/or a vibration sensor.

In one embodiment, the helical antenna component may comprise a plurality of helical antennas. In some instances, the plurality of helical antennas may be configured to enable communication with a plurality of corresponding stationary transceiver assemblies. In this regard, the plurality of helical antennas may be configured to use a plurality of separate, distinct, closely spaced narrow band frequencies, providing signal separation and diversity.

In one embodiment, the helical antenna component may be coupled to a ground plate in form of an electrically conductive disc (e.g. a metal disc) dielectrically coupled to the shaft.

In one embodiment, winding direction of the helical antenna component may be in a rotation direction or a counter rotation direction of the shaft.

In one embodiment, the helical antenna component may comprise a wire winding, a direct write technology imprinting based wire trace on a dielectric sleeve, a wrapped printed circuit board, a flex circuit board wrapped around a dielectric sleeve, or a combination thereof.

In one embodiment, the helical antenna component may be configured to communicate with a corresponding stationary transceiver assembly. In this regard, the stationary transceiver assembly may be configured to support a wide bandwidth sufficient to cover at least all frequencies used by the helical antenna component. In some instances, the stationary transceiver assembly may comprise one or more stationary antennas proximate to the helical antenna component, for use in transmitting and/or receiving signals. In this regard, the one or more stationary antennas may comprise a wire dipole, a patch, a printed circuit, a spiral, a slot, a cavity, a wave guide based antenna, or a combination thereof. The one or more stationary antennas may comprise a single linear polarized antenna, a single circular polarized antenna, or a combination thereof. In this regard, the single linear polarized antenna may be coupled to a cross dipole element to create a circular polarized antenna matching a rotation of the shaft. Alignment of the single linear polarized antenna relative to a center line of the shaft may range between zero degrees (e.g., corresponding to parallel alignment with the shaft) and 90 degrees (e.g., corresponding to perpendicular alignment with to the shaft).

These and other advantages, aspects and novel features, as well as details of an illustrated embodiment thereof, will be more fully understood from the following description and drawings.

The features, functions, and advantages that have been discussed can be achieved independently in various embodiments or may be combined in yet other embodiments further details of which can be seen with reference to the following description and drawings.

DETAILED DESCRIPTION

Certain embodiments may be found in a method and system for utilizing integrated antenna transceiver for sensor and data transmission on rotating shafts. Many specific details of certain embodiments are set forth in the following description as well as the drawings to provide a thorough understanding of such embodiments. One skilled in the art, however, will understand that there may be additional embodiments, or that certain of these embodiments may be practiced without several of the details described in the following description. Like numbers refer to like elements throughout.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be performed by one or more circuits. As utilized herein, the term "exemplary" means serving as a non-limiting example, instance, or illustration. As utilized herein, the term "e.g.," introduces a list of one or more non-limiting examples, instances, or illustrations.

Figure 1:
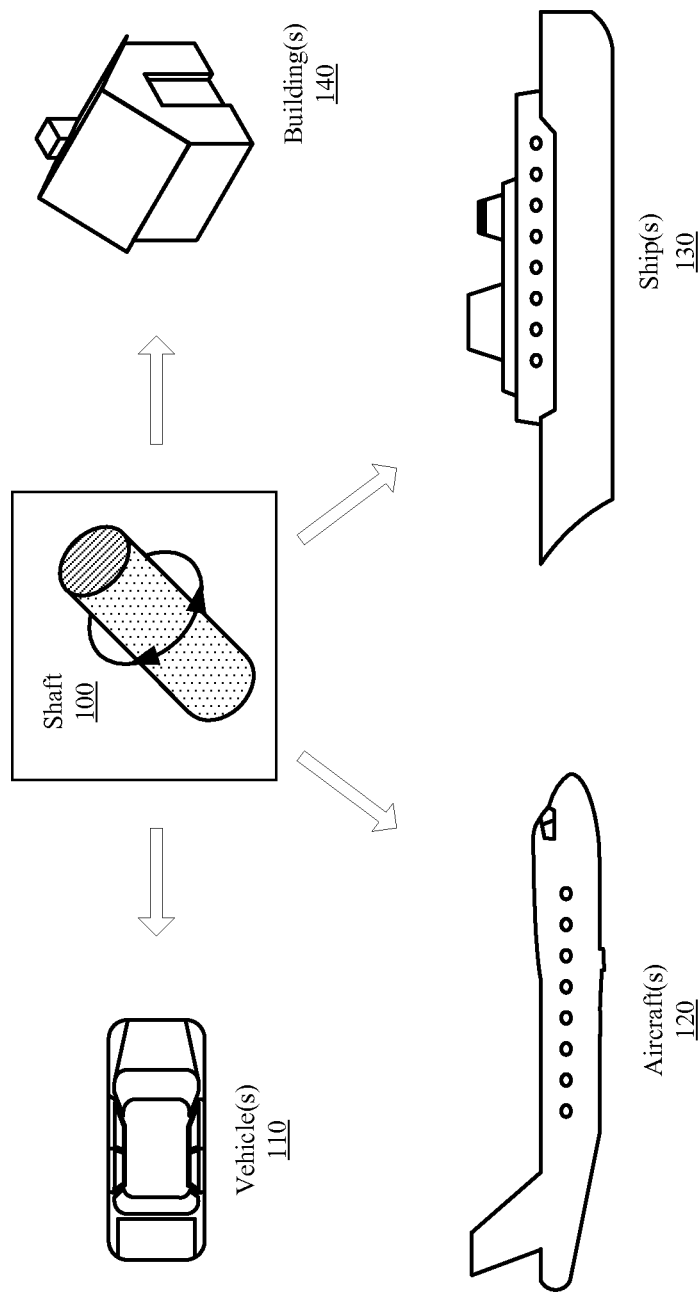
FIG. 1 illustrates an example system comprising rotating shafts.

FIG. 1 illustrates an example system comprising rotating shafts. Referring to FIG. 1, a shaft 100 is shown.

The shaft 100 may comprise a rotating physical object, which may be utilized in various systems, devices and/or setups (or components thereof), to provide or perform rotational functions. For example, shaft assemblies (e.g., assemblies incorporating a shaft 100 along with auxiliary and/or support components) may be utilized in moving systems (e.g., vehicles 110, aircrafts 120, or ships 130) and/or fixed structures (e.g., buildings 140, which may comprise residential or commercial buildings). In this regard, such moving systems and/or fixed structures may comprise one or more components (e.g., mechanical and/or electrical) which may incorporate one or more shaft assemblies. Examples of components that may incorporate use of shaft assemblies may comprise engines (and powertrains as a whole), generators (e.g., portable or stationary electric generators, turbines, etc.), transmissions, gear boxes, or the like. The disclosure is not limited, however, in particular type of systems or structures, or components thereof, and may be utilized in substantially similar manner whenever shafts or other similar rotating objects are used.

In some instances, it may be desirable or necessary to facilitate and/or incorporate capability for communication of data to and/or from shafts. For example, in a mechanical drive system (e.g., comprising one or more shafts 100), it may be desirable to allow a system operator to interact with various components of the system (including shafts), to enable monitoring the 'health' of the mechanical drive system under operation, thus allowing the system operator to detect and repair issues before these issues become critical, and/or to replace or repair the drive system (or components thereof, including shafts) before failure. Such monitoring may entail, in instances where shafts are utilized, tracking and/or gathering physical and/or mechanical information relating to shafts and operations thereof, and the data would then have to be reported to the system operator.

The communication (e.g., allowing reception operator commands/instructions, such as requests for information, and/or transmission of information, such as monitoring related data) may be performed in various manners, including via wireless connections. In this regard, to facilitate wireless communication, transceivers (comprising antennas) may be coupled to the shafts to allow the required transmission and/or reception of RF signals carrying data to/from the shafts. The shaft-side transceiver would then interact with corresponding peer transceiver, which may be coupled to other devices that may be used by system operator. Current approaches in designing or implementing transceivers at the shaft side, to facilitate wireless communication in conjunction with shafts, may cause some issues. For example, the rotating of the shafts (and any moving of the shaft as a whole) must be accounted for with respect to the antennas that may be incorporated into (or couple to) these transceivers—e.g., necessitating constant adjustment to the positioning of the antennas (as to not interfere with the physical movement/rotation of the shaft), etc.

In an example use scenario, to monitor the 'health' of the system, Surface Wave Acoustics (SAW) sensors may be placed on a drive shaft and gears, to provide measurement of various parameters relating to operation of shafts/gears, such as pressure, acceleration, torque, vibration, or the like. Use of such sensors, however, may require power to operate and then to transmit their signal back. These SAW sensors may often be configured in a similar fashion to a RFID tag. Typically a large set of antennas and electronics surrounding the shaft may be used to transmit power to the SAW sensors and/or devices on the shaft, interrogate the sensors/devices, and receiving information reported back by the sensors/devices. An antenna (dipole or patch) may be attached to the rotating SAW sensor, coupled to transceiver circuitry (e.g., to enable signals to be sent and/or received from the shaft, the shaft may be surrounded by a ring of electronics and antennas).

Accordingly, in various implementations, shafts may be configured to incorporate means that may allow for transmission and/or reception of signals wirelessly, to and from the shafts in a compact, simple and integrated fashion, such as by use of improved transceiver antenna pair. Furthermore, in some implementations, the transceiver antenna pairs may be utilized to provide wireless transfer of power (e.g., electrical power) to the shafts, components thereof, and/or systems attached or coupled thereto. In this regard, in some instances, the monitoring may also entail providing electrical power to sensors and/or other electronics on the shafts that may be used in conjunction with the monitoring operations. It may be desirable to provide the power needed to drive these components wirelessly, since providing power by wired means may affect or hinder operations of the shafts. Accordingly, the wireless transfer of electrical power may be done, for example, using the same transceivers pair used in the data communications, with at least a portion of the transferred power then being utilized in driving these components (e.g., the sensors).

In an example implementation, to enable transmission and/or reception of RF (radio frequency) signals to and/or from a moving drive shaft in enhanced manner, by utilizing circular helical like or wound transformer antenna, which may be integrated directly onto the shaft, to facilitate necessary communication to and/or from the shaft. In this regard, data pertaining to the shaft and/or its operations may be obtained—e.g., from torque sensors, health monitoring sensors, or other devices where data must be collected from a sensor or devices located on a drive shaft). The communication setup may comprise a transceiver pair, with one side of the transceiver pair corresponding to a transceiver on the shaft (or coupled to it). This shaft-side transceiver may comprise an antenna, or a set of antennas, located directly on the shaft and is based on a helical antenna design approach. The other side of the transceiver pair may comprise a stationary transceiver assembly, which may comprise transceiver circuitry and a stationary antenna—e.g., comprising a single linear polarized antenna, a single circular polarized antenna, or a combination thereof. The stationary transceiver assembly may be placed in close proximity of the helical antenna(s) on the shaft. The use of such circular helical or wound transformer like antenna directly onto the shaft may allow eliminating the need for the large transceiver attached to the shaft. In this regard, the large transceiver circuitry (and its array electronics) may be replaced by a simple, single antenna that can be any linear polarized antenna, or a circular antenna whose winding is matched with (or is counter to) the rotation of the shaft. An example of such implementation is provided in more detail in FIG. 2. In an alternate embodiment the transceiver pair, circular helical like or wound transformer antenna may be used to provide wireless power to the sensors and transceiver on the shaft.

Figure 2:
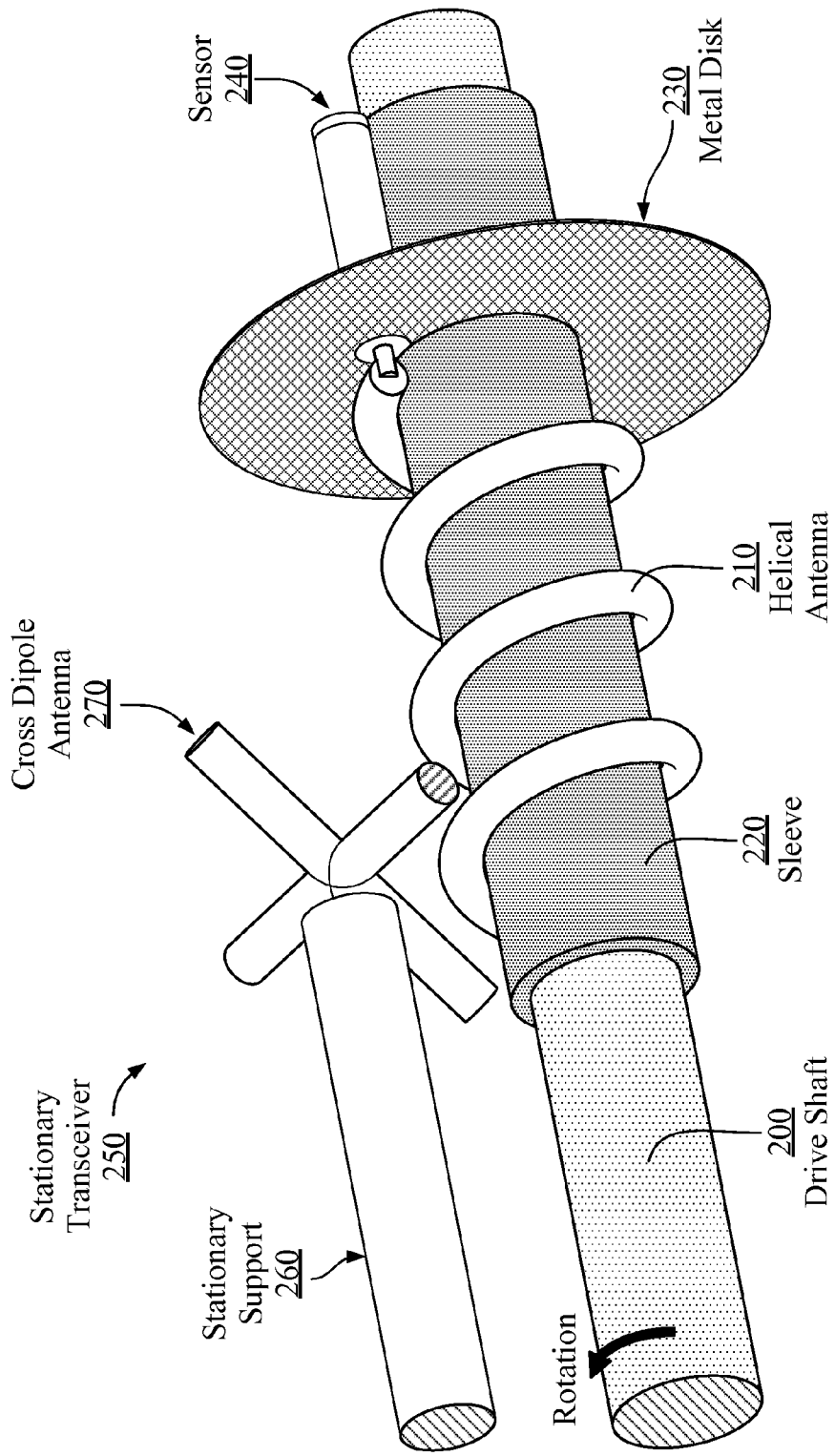
FIG. 2 illustrates an example communication setup, comprising a stationary transceiver and a helical antenna based transceiver attached to a rotating shaft, for use in communication of data relating to the shaft.

FIG. 2 illustrates an example communication setup, comprising a stationary transceiver and a helical antenna based transceiver attached to a rotating shaft, for use in communication of data relating to the shaft. Referring to FIG. 2, there is shown a drive shaft 200. In this regard, the drive shaft 200 may correspond, for example, to any of the rotating shafts 100 of FIG. 1. Also shown in FIG. 2 are a helical antenna 210, a sleeve 220, a sensor 240, and a stationary transceiver 250 with its support structure 260.

In some instances, data relating to the drive shaft 200, and/or its operations, may be communicated, to and/or from the drive shaft 200. For example, the sensor 240 may be utilized to obtain sensory information relating to drive shaft 200 and/or its operations. In this regard, the sensor 240 may comprise suitable circuitry, interfaces, logic and/or code for performing sensory related operations. The sensor 240 may comprise, for example, a toque sensor, a vibration sensor, or the like. The sensory information obtained via the sensor 240 may need to be transmitted (e.g., reported to other components, such as control systems), and/or control messaging may need be received (e.g., adjusting operations of the sensor 240 and/or requesting particular information/readings). In some instances, use or operation of the sensor 240 may require providing power to drive the sensor 240 (e.g., during gathering of information, reception of user messages, and/or communication of collected data). Accordingly, the sensor 240 may be powered based on transfer of power, such as via wireless RF transmission from the stationary transceiver 250 to the helical antenna 210.

Accordingly, in various implementations, additional communication related components may be used to facilitate any required transfer of power, to the shaft, and/or communication of data, to and/or from the shaft. In this regard, some of the communication related components may be attached or coupled to, and/or integrated into the drive shaft 200, to support the communication of data at that side, with corresponding communication components/systems being used to support the communication of data at the other side. For example, a transceiver assembly may be coupled or attached to the drive shaft 200, thus enabling communication of data to/from the drive shaft 200. In the regard, the shaft-based transceiver assembly may comprise, inter alia, one or more antennas that would enable the wireless communication of data, over wireless interface(s), to and/or from the drive shaft 200.

The stationary transceiver 250 may be utilized in communicating with the helical antenna 210 (e.g., serving as corresponding peer in communication of sensory data and/or control messaging). For example, the stationary transceiver 250 may be connected or coupled to control systems, which may receive (and process) sensory data transmitted from the drive shaft 200, may transmit control messages (e.g., requesting information from the sensor 240, or adjusting its operations), and/or may provide (wirelessly) power to the sensor 240. The station transceiver 250 may comprise a stationary support component 260, which may be configured to hold an antenna component that is used in communicating with the helical antenna 210. The antenna component of the stationary transceiver 250 may comprise, for example, cross dipole antenna 270.

In operation, operations of the drive shaft 200 may be monitored (e.g., using the sensor 240). In this regard, the sensor 240 may collect different information relating to the shaft 200 and/or its operations. For example, the sensor 240 may comprise a SAW sensor configured to collect such information as torque. The collected information may be reported to an integrator system (e.g., a suitable system/device being used by operator(s) monitoring components comprising the shaft 200). In this regard, the collected information may be transmitted via the helical antenna 210, and may be received, on the other side, via the stationary transceiver 250. The collection of information may be performed in different manners. For example, in some instances, monitoring may be done based on automatic collection of information, e.g., at particular intervals and without necessitating requests from the integrator system, with the collected information being then reported. In other instances, however, the collection of information may only be done based on requests from the integrator system. Accordingly, the helical antenna 210 may be configured to receive signals carrying these requests (which may be transmitted via the stationary transceiver 250). The same communication link (i.e., transmittals via the stationary transceiver 250 and reception via the helical antenna 210) may also be utilized to communicate to the shaft 200 other messages, such as other user commands or instructions (e.g., for adjusting operations of the shaft 200 or the component comprising the shaft 200).

As shown in FIG. 2, helical antenna 210 may comprise a four turn single helical antenna that is wrapped around the drive shaft 200. The feed of the helical antenna 210 may be directly attached to the sensor 240. The helical antenna 210 may be separated from the sensor 240 using the sleeve 220, which may comprise a non-conductive sleeve. In this regard, the sleeve 220 may comprise a dielectric (e.g., low-loss dielectric foam) sleeve, which may be used to space the helical winding (of the helical antenna 210) off of the metal drive shaft. In an alternate implementation the sleeve 220 may comprise a plurality of materials and thicknesses. In an alternate implementation the sleeve 220 may encompass and enclose the helical antenna 210. In some instances, use of ground plates may be necessary—for proper operation of helical antennas. A metal disk 230 may be attached to the shaft 200, being used to provide a ground plate for the helical antenna 210. In this regard, use of ground plates may be necessary for proper operation of helical antennas (e.g. providing necessary 'grounding'). In an alternate implementation the metal disk 230 may be comprised of a plurality of conductive materials including but without limitation, wire mesh, metal foil, carbon-fiber, and metallic spray coatings. The use of the sleeve 220 and the ground (metal) disk 230 may allow use of the helical antenna 210 in a manner that does not affect the shaft 200 or its operations. For example, the use of the sleeve 220 may protect the shaft from any damage that may be caused by the antenna. Also, the use of the sleeve 220 and/or the ground (metal) disk 230 may ensure that the antenna 210 is electrically decoupled from the shaft 200.

The interrogator system may comprise the stationary transceiver 250. In this regard, the stationary transceiver 250 may comprise a single antenna based system, comprising an stationary antenna 270 supported, using stationary support 250, at some distance off from the drive shaft 200 but in close proximity to the helical antenna 210 and the drive shaft 200. For example, as shown in FIG. 2, the stationary antenna 270 may comprise a cross dipole antenna, to create a circular polarized antenna matching the rotation direction of the shaft 200. The winding of the circular antenna may also be done such that it counters the rotation direction of the shaft 200.

The disclosure, however, is not limited to the design described with respect to FIG. 2. In this regard, various aspects of the implementation (as described with respect to FIG. 2) may be altered or modified. For example, in some implementations, the design of the helical antenna may be changed—e.g., based on use of different number of windings (turns), changes in diameters of the wire, direction of the winding, size and shape of the ground plate (disk), and the like. Also, other methods of construction may be utilized—e.g., including using of direct write technologies, bent/wrapped printed circuits boards, and/or flex circuit boards wrapped around the dielectric sleeve. The sleeve 220 may be constructed by direct write methods, machined sleeves, and/or the use of low-loss dielectric foams.

Also, in some implementations, the design of the interrogator system may be modified—e.g., include the use of linear polarized antennas. The antenna utilized in the interrogator system may be made using any standard antenna design approach including, but not limited to, wire dipole, patch, printed, spiral, slot, and cavity, or wave guide based antenna. Also, the placement and/or positioning of the interrogator system may be changed. For example, as shown in FIG. 2, the interrogator system may be tilted towards the shaft. In other implementations, however, the position, orientation, and tilt (or alignment) of the interrogator system may be altered—e.g., the tilt (or alignment) being anywhere between 0° (i.e. parallel or co-axial with the shaft) to normal (or 90°)—i.e. perpendicular to the shaft.

In an example implementation, antennas used on the shaft-side and/or on the interrogator system side may be implemented to use a set of windings—e.g., similar to RF transformers (i.e., by winding wires around a 'core'). In this regard, for the antenna mounted on the shaft, that antenna may comprise a winding wire, or thin and closely spaced direct wire traces on top of the dielectric sleeve forms one side of a transformer winding. In this regard, the thinness and/or closeness in spacing of the direct write traces may be determined based on various criteria—e.g., optimizing performance of the antenna, maintaining isolation between antenna and shaft, etc. For the interrogator system side, a different winding around a core may be utilized. The two windings may then be placed in close proximity forming a 'transformer' pair.

Figure 3:
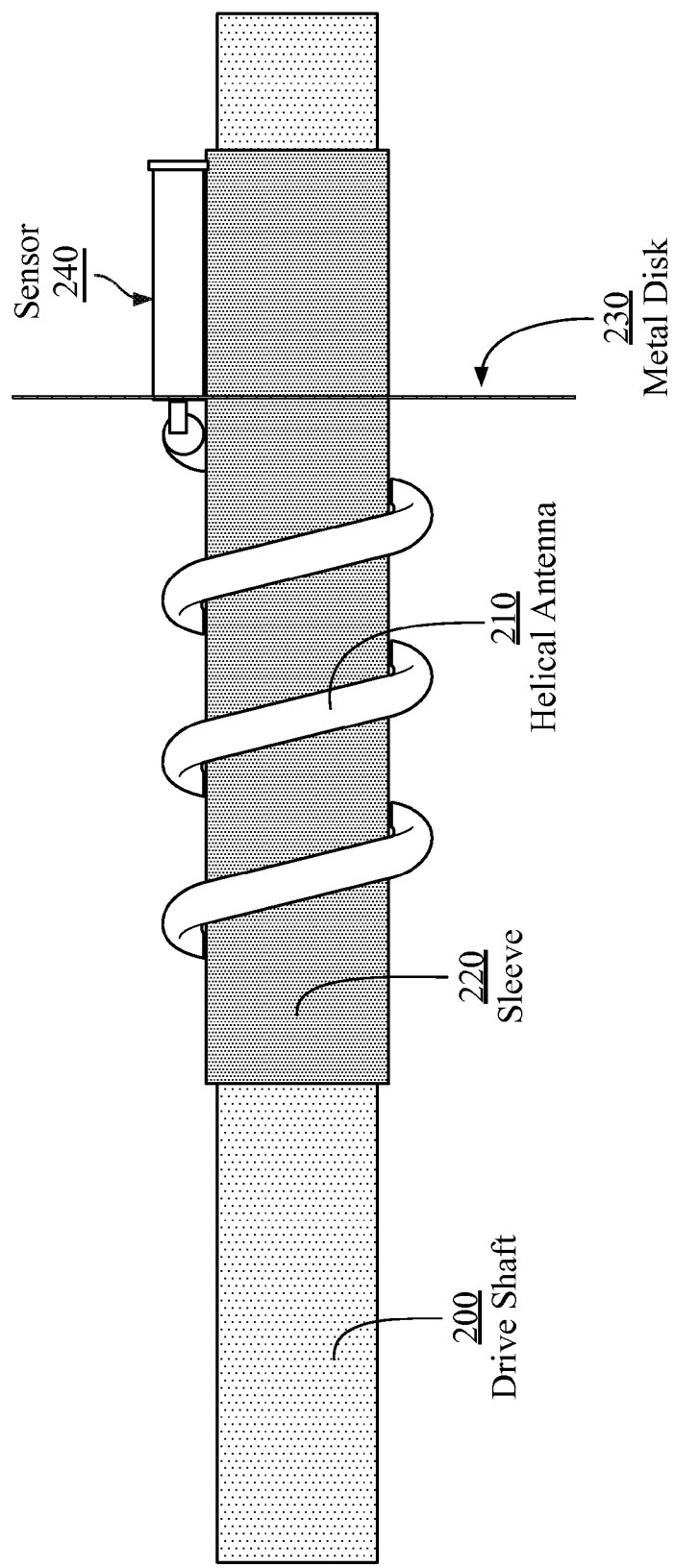
FIG. 3 illustrates an example helical antenna based transceiver assembly for use in communication of data relating to rotating shafts.

FIG. 3 illustrates an example helical antenna based transceiver assembly for use in communication of data relating to rotating shafts. Referring to FIG. 3, there is shown the drive shaft 200, the helical antenna 210, the sleeve 220, and the sensor 240 of FIG. 2. In this regard, FIG. 3 provides a clearer sideway view of the shaft 200 and the additional components used to collect the information (e.g., the sensor 240) and in reporting the information (e.g., the helical antenna 210, the sleeve 220, and the metal disk 230).

Figure 4:
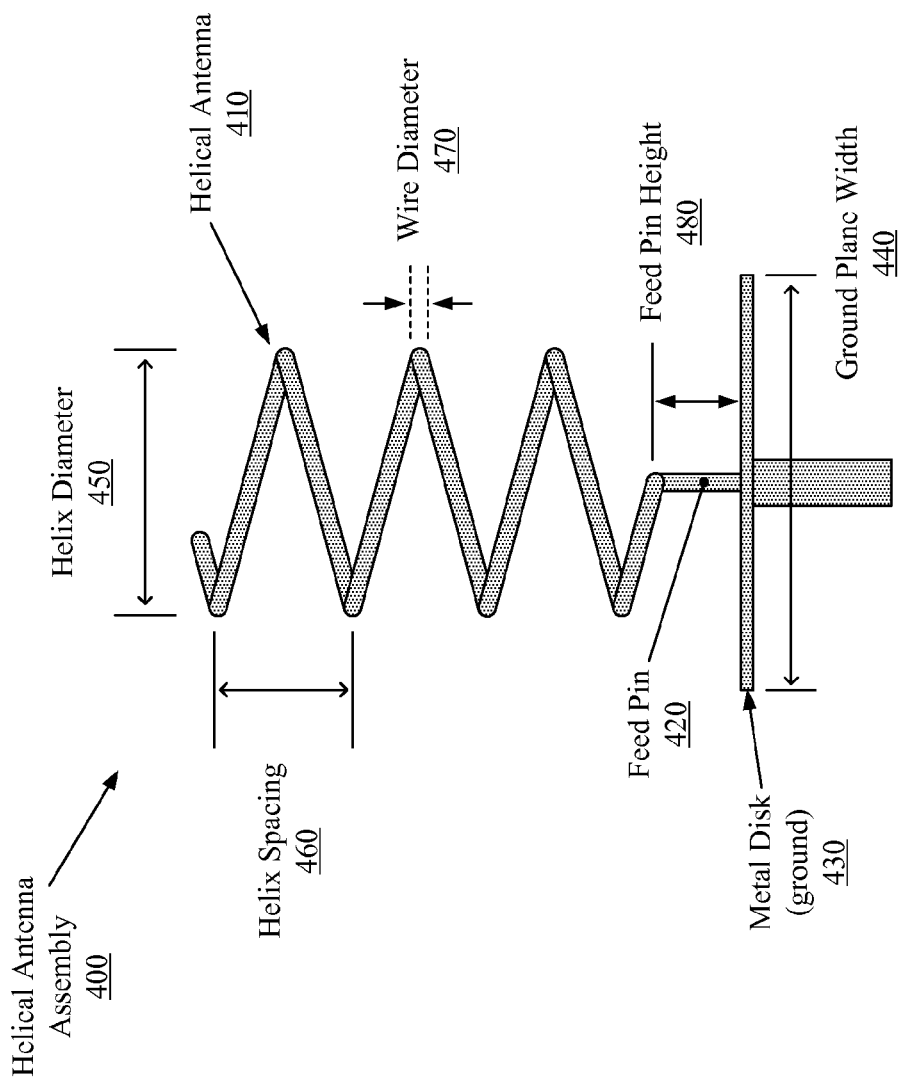
FIG. 4 illustrates an example helical antenna assembly for use in transceiver assemblies that may be utilized in communication of data relating to rotating shafts.

FIG. 4 illustrates an example helical antenna assembly for use in transceiver assemblies that may be utilized in communication of data relating to rotating shafts. Referring to FIG. 4, there is shown a helical antenna assembly 400.

The helical antenna assembly 400 may be utilized in communicating signals. In this regard, the helical antenna assembly 400 may be utilized in communicating signals carrying data and/or control messaging. For example, the helical antenna assembly 400 may be incorporated, as a helical antenna component, into shaft assemblies (e.g., a shaft assembly incorporating the drive shaft 200 of FIG. 2) for use in communicating signals carrying sensory data and/or control messaging to and/or from the drive shaft 200. In the example implementation shown in FIG. 4, the helical antenna assembly 400 may comprise, for example, a helical antenna 410, a feed pin 420, and a metal disc 430.

In operation, the helical antenna assembly 400 may be configured to provide communication of signal in particular manner. For example, the helical antenna assembly 400 may be configured to, for example, use in supporting communication to and/or from rotating shafts—e.g., being implemented (wrapped) around the shaft. Configuring the helical antenna assembly 400 may comprise selecting, setting and/or adjusting various parameters that may pertain to different components of the helical antenna assembly 400. In this regard, example of parameters that may be set or configured may comprise number of windings (turns) of the helical antenna 410, helix spacing 460 between the turns, direction of the winding of the helical antenna 410, helix diameter 450 of the helical antenna 410 (which may be set based on diameter of the shaft and thickness of sleeve), wire diameter 470 of the helical antenna 410, size and shape of the ground plate (metal disk) 430 (e.g., ground plate width 440, feed pin height 480), and the like. In some implementations, the helix diameter 450, spacing 460, and/or wire diameter 470 may be non-uniform and vary along the axis of the shaft. In some instances, at least some of the parameters may be determined using a suitable software application or program. In this regard, the software application or program may be configured to output some of the parameters based on one or more input parameters or criteria, such as dimensions of the shaft, desired communication performance (e.g., range, expected data rates, directionality, etc.). The software application or program may run on suitable systems or devices (e.g., personal computer or the like).

Figure 5:
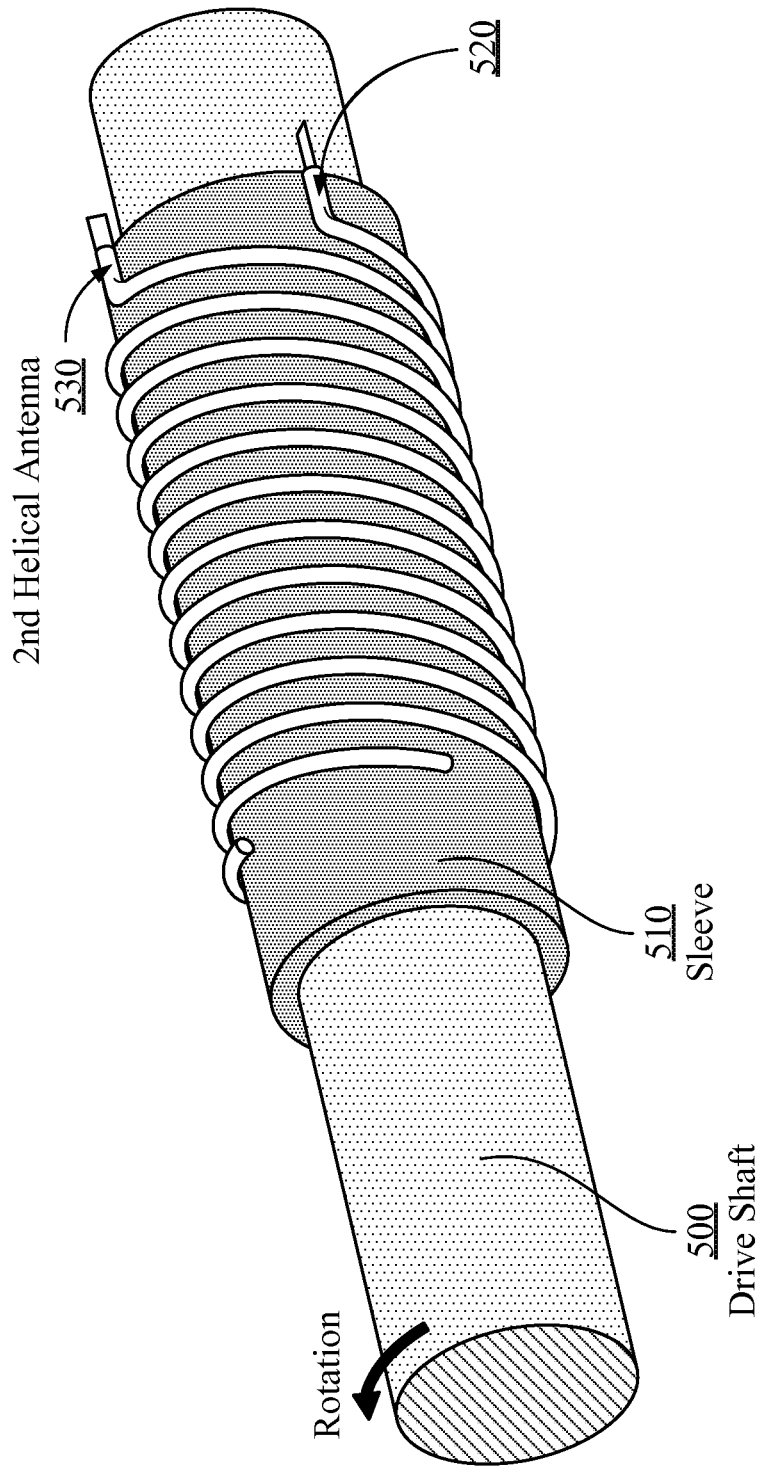
FIG. 5 illustrates an example multi-helical antenna based transceiver assembly for use in communication of data relating to rotating shafts.

FIG. 5 illustrates an example multi-helical antenna based transceiver assembly for use in communication of data relating to rotating shafts. Referring to FIG. 5, there is shown a drive shaft 500, a sleeve 510, and a plurality of helical antennas (e.g., in the implementation shown in FIG. 5, there may be 4 helical antennas, of which helical antennas 520 and 530 are shown, with the other two antennas being hidden by the shaft 500—i.e., on the other/opposite side of the shaft 500).

The drive shaft 500 may be similar to the shaft 200 of FIG. 2. Each of the helical antennas 520 and 530 may be similar to the antenna 210 of FIG. 2. The sleeve 510 may be similar to the sleeve 220 of FIG. 2.

In operation, in some instances, a plurality of helical antennas may be incorporated into a single shaft. This may allow supporting use of multiple sensors (e.g., for reporting different types of information). For example, in the example implementation shown in FIG. 4, the shaft 500 may be designed to incorporate a multiple sensor configuration, such as with four sensors. The interrogator antenna(s) and the ground plate (e.g., metal disk) are not shown, but it should be understood that these elements would also be utilized. To enhance performance, when incorporating multiple antennas into a single helical antenna assembly, the multiple antennas may be configured to use separate, distinct, and/or closely spaced narrow band frequencies, to provide sufficient signal separation and diversity. For example, in the example implementation of FIG. 5, the four antennas may be configured to utilize separate, distinct narrow band frequencies, with these narrow band frequencies being selected (e.g., based on analysis) such as they provide signal separation and diversity (i.e., interference between the bands is minimal). In addition, and to optimize use of available wireless spectrum, these bands would be selected such that they can be as close as possible to each other while still ensuring sufficient separation and diversity. Furthermore, the multiple helical antennas may be implemented (e.g., their characteristics, the manner by which they may be wrapped around the shaft 500, etc.) to optimize their performance and/or reduce interference there between. For example, the helical antennas may be designed to be wide enough in bandwidth to cover all four frequencies of the sensors.

Figure 6:
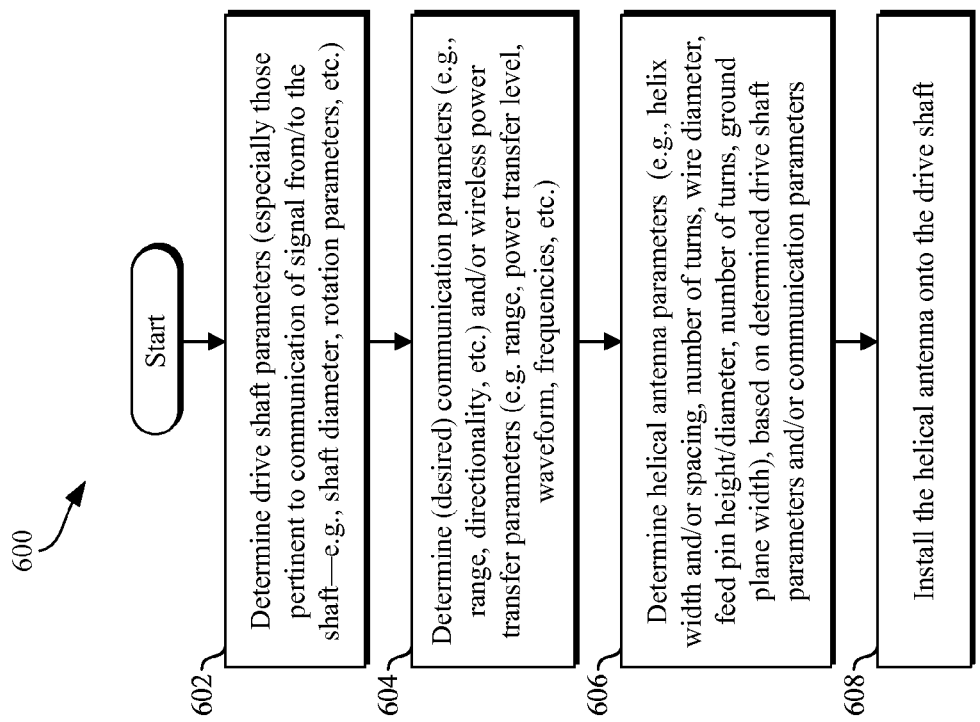
FIG. 6 is a flow chart that illustrates an example process for configuring a helical antenna based transceiver assembly for use in communication of date from/to rotating shafts.

FIG. 6 is a flow chart that illustrates an example process for configuring a helical antenna based transceiver assembly for use in communication of date from/to rotating shafts. Referring to FIG. 6, there is shown a flow chart 600, comprising a plurality of example steps, which may be performed to design and/or configure a helical antenna for use in a transceiver assembly that is utilized in communication of data from/to a rotating shaft.

In step 602, shaft parameters (especially those pertinent to communication of signal from/to the shaft—e.g., shaft diameter, rotation speed/frequency, etc.) may be determined. In step 604, communication parameters (e.g., communication range, directionality, data rate, etc.) and/or RF wireless power transfer parameters (e.g. range, power transfer level, waveform, frequencies, etc.) may be determined. For example, at least some of the communication parameters may be determined by the system operator (as 'desired' parameters). In step 606, the helical antenna parameters (e.g., helix width and/or spacing, number of turns, wire diameter, feed pin height/diameter, number of turns, ground plate width) may be determined, such as based on determined drive shaft parameters and/or communication parameters. In this regard, the helical antenna parameters may be selected, at least in part, to enable integrating the helical antenna around the shaft (e.g., with sleeve separating the two elements). The helical antenna parameters may be determined in different manners, including, for example, suitable software.

In step 608, the helical antenna may be manufactured and/or configured, based on the helical antenna parameters, and the resultant helical antenna (along with other elements—e.g., sleeve) onto the drive shaft. In some instances, the process may be performed in a manner that may enable configuring and/or installing plurality of helical antennas.

Other embodiments may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for integrated antenna transceiver for sensor and data transmission on rotating shafts.

Accordingly, the presently disclosed embodiments may be realized in hardware, software, or a combination of hardware and software. The present embodiments may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The presently disclosed embodiments may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While described with reference to certain embodiments, it will be understood by those skilled in the art that various changes may be made and equivalents may be substituted without departing from the scope of the presently described embodiments. In addition, many modifications may be made to adapt a particular situation or material to the teachings without departing from its scope. Therefore, it is intended that the presently disclosed embodiments not be limited to the particular embodiment disclosed, but rather will include all embodiments falling within the scope of the appended claims.

What is claimed is:

1. A method, comprising:
   communicating signals to and/or from a shaft assembly, comprising a shaft, via a helical antenna component, wherein:
      the helical antenna component surrounds the shaft, and
      the helical antenna component is electrically decoupled from the shaft;
   communicating, via the signals transmitted or received via the helical antenna component, data generated by a sensor on the shaft, wherein the data corresponds with measurements detected by the sensor and related to operation of the shaft; and
   wirelessly transferring power, via RF signals received via the helical antenna component, to power the sensor on the shaft.

2. The method of claim 1, comprising communicating the signals via the helical antenna component when the shaft is stationary or rotating.

3. The method of claim 1, comprising electrically decoupling the helical antenna component from the shaft using a dielectric sleeve.

4. The method of claim 1, comprising transferring power to the shaft assembly wirelessly via RF signals received via the helical antenna component, wherein at least a portion of a transferred power is utilized to power, electronic components in the shaft assembly, and/or components coupled to the shaft assembly.

5. The method of claim 1, comprising configuring the helical antenna component, when it comprises a plurality of helical antennas, such that each of the plurality of helical antennas utilizes one of a plurality of separate, distinct, closely spaced narrow band frequencies, to provide signal separation and diversity.

6. The method of claim 1, comprising configuring the helical antenna component to interact with one or more corresponding stationary transceiver assemblies.

7. The method of claim 1, comprising configuring the helical antenna component and a corresponding stationary transceiver assembly to use windings around a core simulating a RF transformer during communication of signals, wherein:
   the helical antenna component comprises a first antenna that comprises a shaft mounted winding, the shaft mounted winding comprising a winding wire, or thin and closely spaced direct wire traces coupled to a dielectric sleeve, as one side of the transformer,
   the corresponding stationary transceiver assembly comprises a second antenna that comprises a wire winding around the core, and
   the first antenna and the second antenna are placed in close proximity to form a transceiver pair.

8. A system, comprising:
   a helical antenna component for use in communicating signals to and/or from a shaft assembly, that comprise a shaft, wherein:
      the helical antenna component surrounds the shaft,
      the helical antenna component is electrically decoupled from the shaft, and
      the helical antenna component is configurable to communicate the signals when the shaft is stationary or rotating; and
   a sensor positioned on the shaft for generating data that corresponds with measurements detected by the sensor and related to operation of the shaft, wherein the signals communicated to the shaft assembly via the helical antenna component wirelessly transfer power to the sensor.

9. The system of claim 8, wherein the signals communicated via the helical antenna component are utilized in one or more of: communication of data related to a sensor on the shaft, and wireless transfer of power to the shaft assembly, wherein at least a portion of the transferred power is utilized to power, electronic components in shaft assembly, and/or devices coupled to the shaft assembly.

10. The system of claim 8, wherein the helical antenna component is electrically decoupled from the shaft using a dielectric sleeve.

11. The system of claim 10, wherein the dielectric sleeve comprises one or more of: a direct write method, a machined sleeve, or a low-loss dielectric foam.

12. The system of claim 8, wherein the helical antenna component is coupled to the sensor on the shaft.

13. The system of claim 12, wherein the sensor comprises a torque and/or a vibration sensor.

14. The system of claim 8, wherein the helical antenna component comprises a plurality of helical antennas.

15. The system of claim 14, wherein the plurality of helical antennas is configured to enable communication with a plurality of corresponding stationary transceiver assemblies.

16. The system of claim 14, wherein the plurality of helical antennas are configured to use a plurality of separate, distinct, closely spaced narrow band frequencies, providing signal separation and diversity.

17. The system of claim 8, wherein the helical antenna component is coupled to a ground plate in form of an electrically conductive disc dielectrically coupled to the shaft.

18. The system of claim 8, wherein winding direction of the helical antenna component is in a rotation direction or a counter rotation direction of the shaft.

19. The system of claim 8, wherein the helical antenna component comprises a wire winding, a direct write technology imprinting based wire trace on a dielectric sleeve, a wrapped printed circuit board, a flex circuit board wrapped around a dielectric sleeve, or a combination thereof.

20. The system of claim 8, wherein the helical antenna component is configured to communicate with a corresponding stationary transceiver assembly.

21. The system of claim 20, wherein the stationary transceiver assembly comprises one or more stationary antennas proximate to the helical antenna component, for use in transmitting and/or receiving signals.

22. The system of claim 21, wherein the one or more stationary antennas comprise a wire dipole, a patch, a printed circuit, a spiral, a slot, a cavity, a wave guide based antenna, or a combination thereof.

23. The system of claim 21, wherein the one or more stationary antennas comprise a single linear polarized antenna, a single circular polarized antenna, or a combination thereof.

24. The system of claim 21, wherein the one or more stationary antennas comprise a cross dipole to create a circular polarized antenna matching a rotation of the shaft.

25. The system of claim 23, wherein alignment of the single linear polarized antenna relative to a center line of the shaft ranges between zero degrees, corresponding to parallel alignment with the shaft, and 90 degrees, corresponding to perpendicular alignment with to the shaft.

* * * * *

UNITED STATES PATENT AND TRADEMARK OFFICE
CERTIFICATE OF CORRECTION

PATENT NO. : 9,515,373 B2  
APPLICATION NO. : 14/019348  
DATED : December 6, 2016  
INVENTOR(S) : Charles W. Manry, Jr. et al.

Page 1 of 1

It is certified that error appears in the above-identified patent and that said Letters Patent is hereby corrected as shown below:

In the Claims

Column 12, Line 7:
"utilized to power, electronic"---should read "utilized to power electronic"

Column 12, Line 56:
"utilized to power, electronic"---should read "utilized to power electronic"

Signed and Sealed this
Fourteenth Day of February, 2017

Michelle K. Lee
*Director of the United States Patent and Trademark Office*